(12) United States Patent
Chen et al.

(10) Patent No.: US 8,160,369 B2
(45) Date of Patent: Apr. 17, 2012

(54) IMAGE PROCESSING APPARATUS AND METHOD

(75) Inventors: Chien-Chen Chen, Taipei (TW); Chun-Hsing Hsieh, Hsinchu (TW)

(73) Assignee: Realtek Semiconductor Corp., Hsinchu (TW)

( * ) Notice: Subject to any disclaimer, the term of this patent is extended or adjusted under 35 U.S.C. 154(b) by 342 days.

(21) Appl. No.: 12/605,244

(22) Filed: Oct. 23, 2009

(65) Prior Publication Data

US 2010/0104202 A1 Apr. 29, 2010

(30) Foreign Application Priority Data

Oct. 27, 2008 (TW) ................................ 97141171 A

(51) Int. Cl.
*G06K 9/68* (2006.01)
*G06K 9/48* (2006.01)
*G06K 9/40* (2006.01)

(52) U.S. Cl. .......................... 382/218; 382/199; 382/269

(58) Field of Classification Search .................. 382/199, 382/218, 26, 284, 260, 269, 275
See application file for complete search history.

(56) References Cited

U.S. PATENT DOCUMENTS

| | | | |
|---|---|---|---|
| 6,307,888 B1 | 10/2001 | Le Clerc | |
| 6,359,658 B1 | 3/2002 | He et al. | |
| 7,046,307 B1 | 5/2006 | Hui | |
| 8,050,509 B2 * | 11/2011 | Jeong et al. | ................... 382/261 |
| 2008/0063063 A1 * | 3/2008 | Gelderblom et al. | .... 375/240.16 |

FOREIGN PATENT DOCUMENTS

| | | |
|---|---|---|
| TW | I266535 B | 11/2006 |
| TW | 200823802 A | 6/2008 |
| TW | 200835310 A | 8/2008 |

OTHER PUBLICATIONS

ROC Search Report (and English Translation—1 page) for corresponding Taiwanese Patent Application No. TW 097141171, dated Dec. 24, 2011, 1 page.

* cited by examiner

*Primary Examiner* — Daniel Mariam
(74) *Attorney, Agent, or Firm* — Christie, Parker & Hale, LLP

(57) ABSTRACT

An image processing apparatus for processing a previous image having first pixels and a present image having second pixels. The image processing apparatus includes: a pixel difference calculating unit which calculates pixel differences between corresponding pairs of the first and second pixels, and outputs pixel difference values; an edge processing unit which detects and compares edge types of the first and second pixels, sums a number of the edge types that are the same, and outputs a sum value; a noise level processing unit which calculates a noise level of the present image according to the sum value and the pixel differences; a blending value determining unit which determines a blending value according to the noise level; and an output unit which adds weights of the present and previous images according to the blending value and outputs an output image. An image processing method is also disclosed.

12 Claims, 11 Drawing Sheets

IMAGE PROCESSING APPARATUS AND METHOD

CROSS-REFERENCE TO RELATED APPLICATION

This application claims priority of Taiwanese Application No. 097141171, filed on Oct. 27, 2008.

BACKGROUND OF THE INVENTION

1. Field of the Invention

The present invention relates to a noise level determining apparatus, more particularly, to an apparatus for determining the noise level in image data.

2. Description of the Related Art

The quality requirements for video content are continuously being raised as a result of the rapid advances in signal processing technology. Video content with high picture quality and high resolution is already being widely used in various types of image display apparatuses, such as high-definition televisions (HDTVs), LCD monitors for personal computers, etc.

Video content typically includes a plurality of frames or fields. During processing or transmission of video signals, it is common for some of the frames or fields to be affected by noise to thereby undergo change (e.g., some pixel values change). High-resolution display apparatuses are more sensitive to noise in video content. That is, when video content is subjected to noise interference, the effect is more pronounced in high-resolution display apparatuses, such that the quality of the video content is reduced. Therefore, the determination of the level of noise and ways in which noise may be suppressed or eliminated are critical issues in the area of video processing technology.

Mean absolute difference (MAD) is a commonly used technique for determining whether video content is being subjected to noise. The formula for MAD is as shown in the following Formula (F1):

$$MAD(dx, dy) = \frac{1}{m \cdot n} \sum_{i=0}^{n} \sum_{j=0}^{m} |P_k(i, j) - P_{k-1}(i, j)| \quad (F.1)$$

where m and n are resolution dimensions of video content, $P_k(i,j)$ is a pixel value of a pixel at position (i,j) of a kth frame, and $P_{k-1}(i,j)$ is a pixel value of a pixel at position (i,j) of a (k−1)th frame. "Pixel value" refers to the luminance value (luma) or the chromatic value (chroma) of a pixel.

An example is provided with reference to FIG. 1. In a consecutive frame sequence (S) including frame $S_1, S_2 \ldots S_{k-1}, S_k, S_{k+1}$, etc., if an object $O_k$ in the frame $S_k$ is not moved relative to an object $O_{k-1}$ in the frame $S_{k-1}$, then in theory each pixel value in the frame $S_k$ will be the same as the pixel value in a corresponding location in the frame $S_{k-1}$, and therefore, a MAD value of zero is calculated using Formula (F1).

If noise is present in the frame $S_k$, then at least one pixel value in the frame $S_k$ is changed. Referring to FIG. 2, ignoring any affect due to dynamic imaging (i.e., movement in an image) and assuming that a pixel value(s) in the frame $S_k$ is changed as a result of signal nose, then $MAD_{noise}$ may be calculated based on Formula (F1) as follows:

$$MAD_{noise} = \frac{1}{5 \cdot 5} \begin{bmatrix} |45-40| + |35-35| + |32-32| + |41-41| + \\ |40-40| + |47-20| + |30-26| + |20-25| + \\ |36-30| + |35-35| + |40-20| + |20-20| + \\ |18-20| + |24-24| + |11-27| + |20-20| + \\ |18-20| + |20-20| + |10-18| + |26-26| + + \\ |20-20| + |29-20| + |20-20| + |10-20| + \\ |36-25| \end{bmatrix}$$
$$= 5$$

The larger the value of MAD, the greater the amount of noise, that is, the greater the influence of noise on the pixels. Conversely, the lower the value of MAD, the smaller the amount of noise, that is, the smaller the influence of noise on the pixels. Hence, in the prior art, the presence of noise is determined according to how high or low the value of MAD is.

Referring to FIGS. 3 and 4, if it is assumed that an object $O_k$ in the frame $S_k$ is moved relative to an object $O_{k-1}$ in the frame $S_{k-1}$ and has not been influenced by noise, then $MAD_{motion}$ is calculated as follows:

$$MAD_{motion} = \frac{1}{5 \cdot 5} \begin{bmatrix} |20-40| + |20-35| + |26-32| + |25-41| + \\ |30-40| + |20-20| + |20-26| + |20-25| + \\ |20-30| + |24-35| + |20-20| + |20-20| + \\ |20-20| + |20-24| + |18-27| + |20-20| + \\ |20-20| + |20-20| + |20-18| + |20-26| + + \\ |20-20| + |20-20| + |20-20| + |20-20| + \\ |20-25| \end{bmatrix}$$
$$= 5$$

From the foregoing, it is evident that with respect to the frame $S_k$, there is no difference between $MAD_{noise}$ occurring when there is noise and $MAD_{motion}$ occurring when there is object movement in a frame. Hence, using the conventional determination method, it is not possible to determine whether differences in pixel values between a present image and a previous image are due to noise interference or dynamic imaging.

When movement in an image is mistaken for noise interference, loss of image fidelity will occur. Since MAD is the result of object movement during dynamic imaging, each pixel value in the frame $S_k$ is not necessarily related to the previous frame $S_{k-1}$. For example, due to object movement, pixel (i,j) may be part of an object in the frame $S_{k-1}$, while the same pixel (i,j) may be part of the background in the frame $S_k$. If this is mistaken for noise interference, and mean processing is performed for the pixel values of the previous and subsequent images in order to cancel the noise, the end result may be image streaking.

SUMMARY OF THE INVENTION

Therefore, the object of the present invention is to provide an image processing apparatus for processing a previous image and a present image to output an output image, the previous image having a plurality of first pixels and the present image having a plurality of second pixels. The image processing apparatus comprises: a pixel difference calculating unit for calculating pixel differences between pairs of the first and second pixels at corresponding positions, and outputting a plurality of pixel difference values; an edge processing unit for detecting and comparing edge types of the first pixels and edge types of the second pixels, summing a number of the edge types that are the same, and outputting a sum value; a noise level processing unit coupled to the edge processing unit and the pixel difference calculator, and which calculates a noise level of the present image according to the sum value and the pixel differences; a blending value determining unit coupled to the noise level processing unit, and which determines a blending value according to the noise level; and an output unit coupled to the blending value determining unit, and which adds weights of the present image and the previous image according to the blending value to generate and output the output image.

It is another object of the present invention to provide an image processing method for processing a previous image and a present image to output an output image, the previous image having a plurality of first pixels and the present image having a plurality of second pixels. The image processing method comprises: calculating pixel differences between pairs of the first and second pixels and the second pixels at corresponding positions, and outputting a plurality of pixel difference values; detecting and comparing edge types of the first pixels and edge types of the second pixels, summing a number of the edge types that are the same, and outputting a sum value; calculating a noise level of the present image according to the sum value and the pixel differences; determining a blending value according to the noise level; and adding weights of the present image and the previous image according to the blending value to generate and output the output image.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
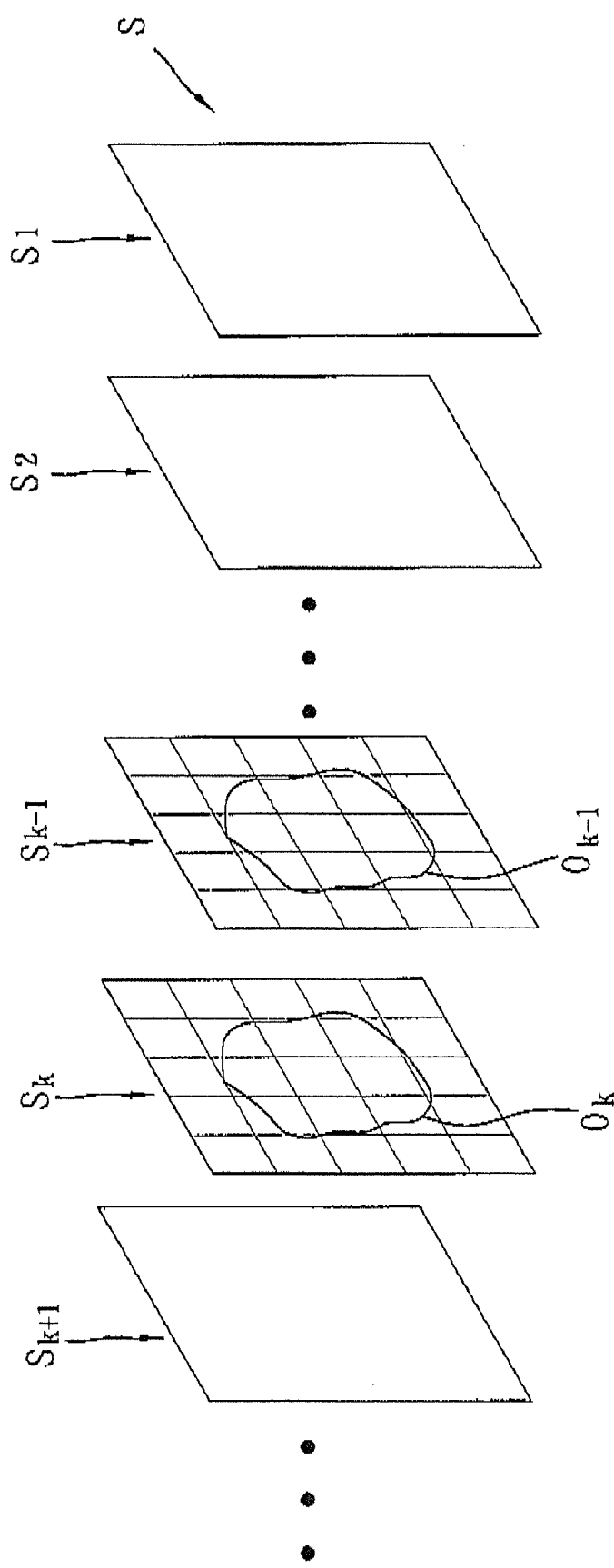
FIG. 1 is a schematic diagram of a frame sequence.
Figure 2:
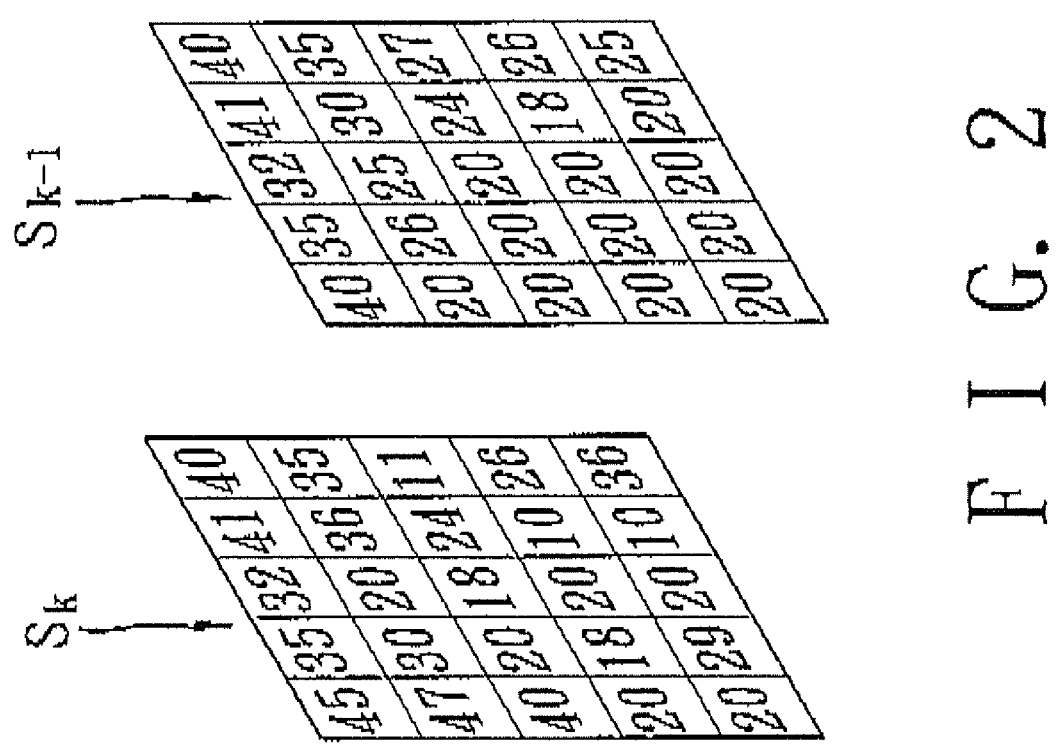
FIG. 2 is a schematic diagram for illustrating how pixel values of an image are affected by noise interference.
Figure 3:
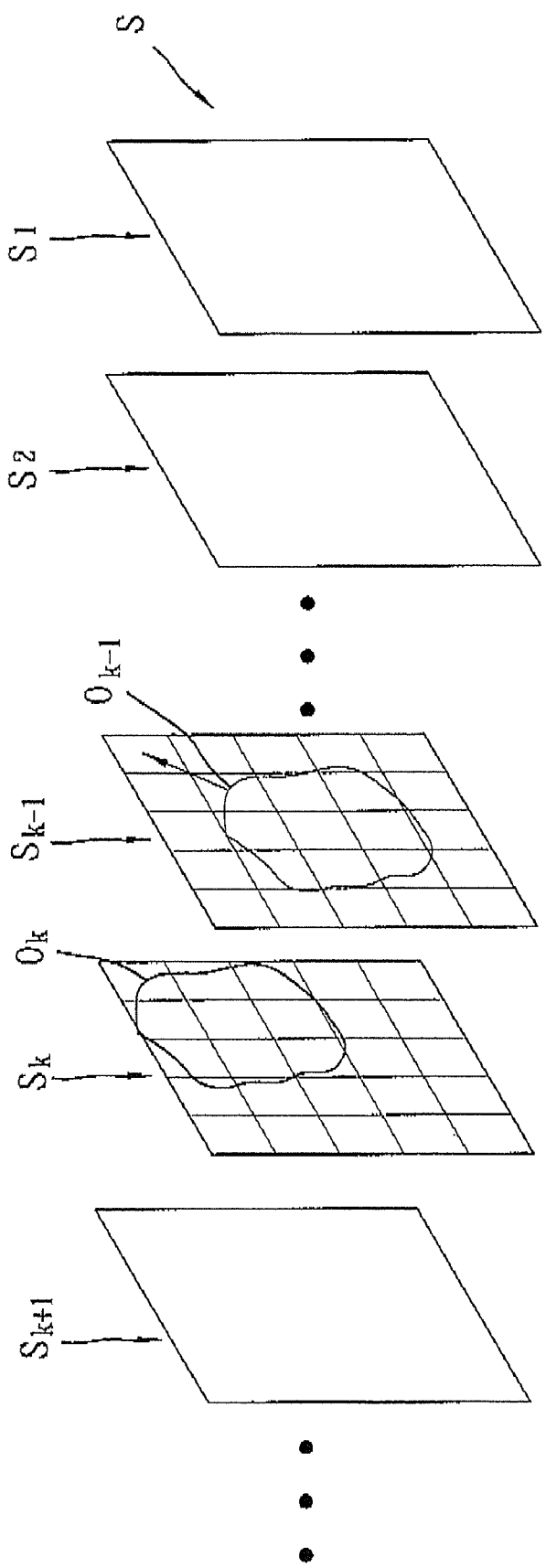
FIG. 3 is a schematic diagram of a frame sequence including a moving object.
Figure 4:
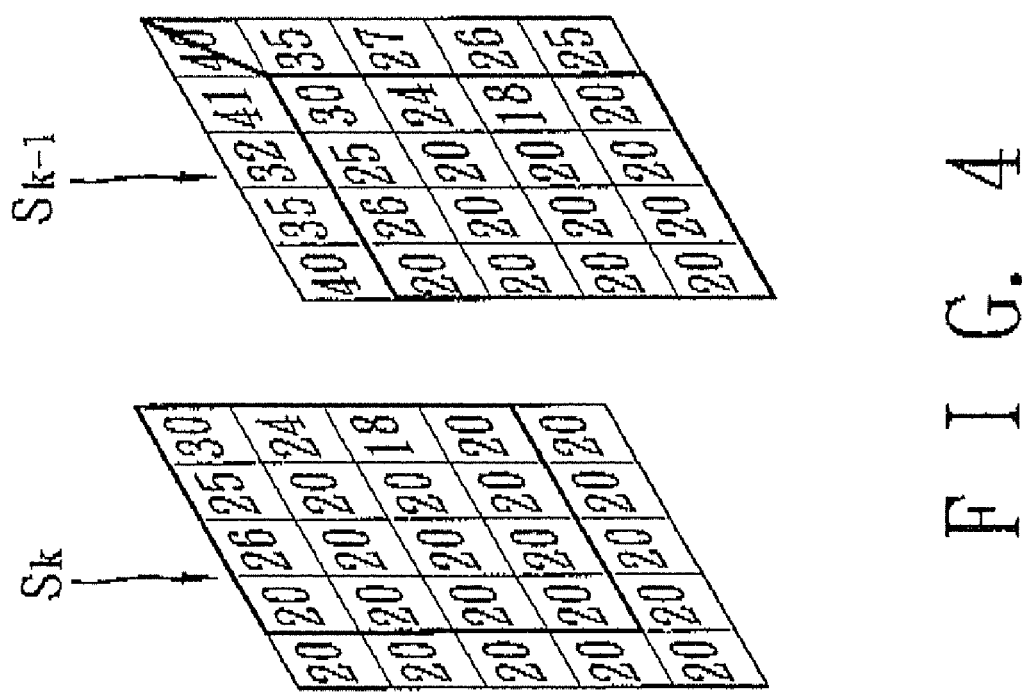
FIG. 4 is a schematic diagram for illustrating pixel values of an image including a moving object.

Before the present invention is described in greater detail with reference to the accompanying preferred embodiments, it should be noted herein that like elements are denoted by the same reference numerals throughout the disclosure.

First Preferred Embodiment

Figure 5:
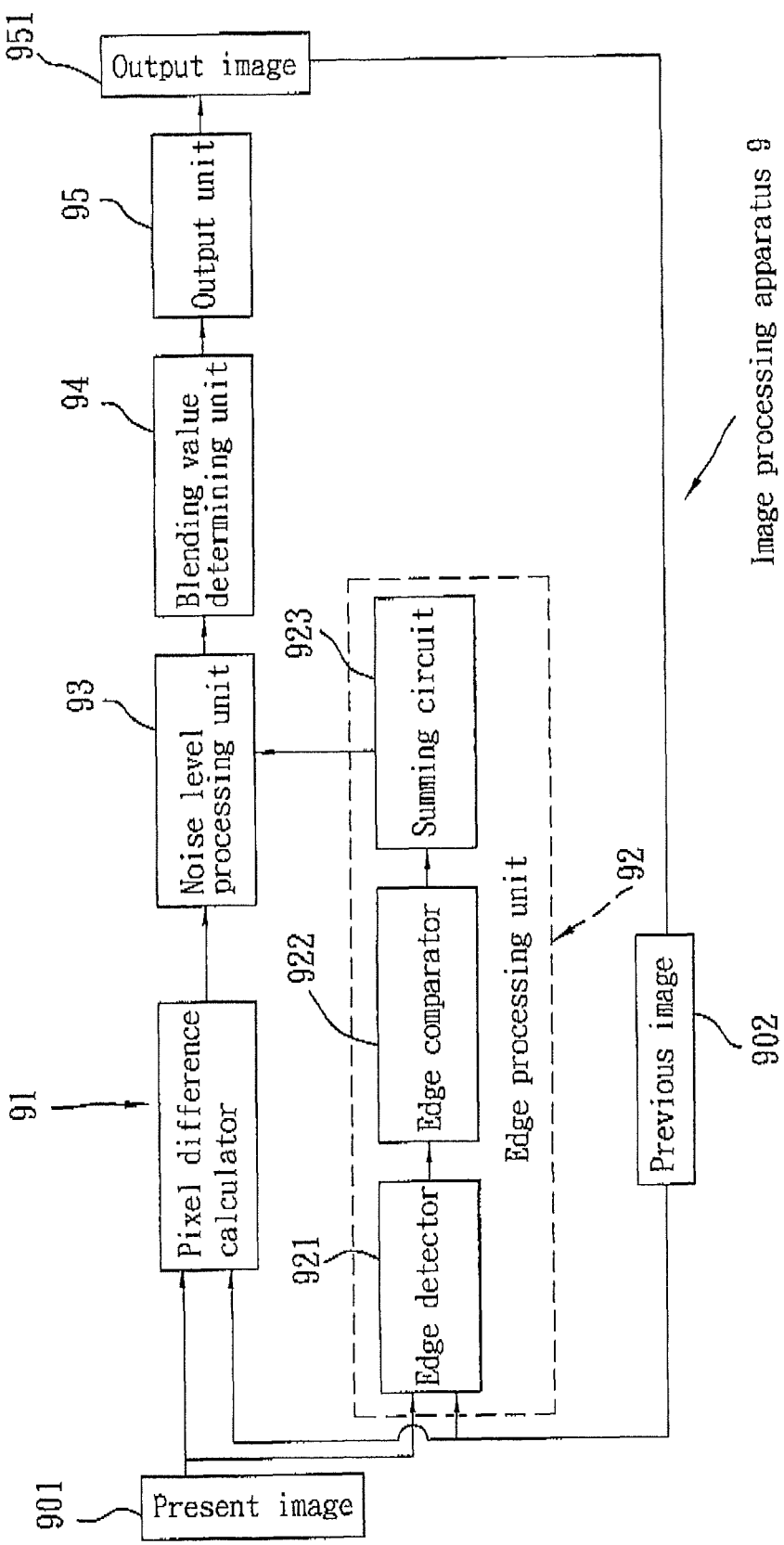
FIG. 5 is a schematic circuit block diagram of the first preferred embodiment of an image processing apparatus according to the present invention.

Referring to FIG. 5, the first preferred embodiment of an image processing apparatus 9 according to the present invention includes a pixel difference calculator 91, an edge processing unit 92, a noise level processing unit 93, a blending value determining unit 94, and an output unit 95.

The pixel difference calculator 91 receives a present image 901 and a previous image 902. Each of the present image 901 and the previous image 902 is a frame and has a plurality of pixels. Each pixel has a pixel value, which includes a luma and a chroma. The pixel difference calculator 91 calculates absolute values of pixel differences between pixels at corresponding positions of the present image 901 and the previous image 902 for subsequent output to the noise level processing unit 93.

Figure 6:
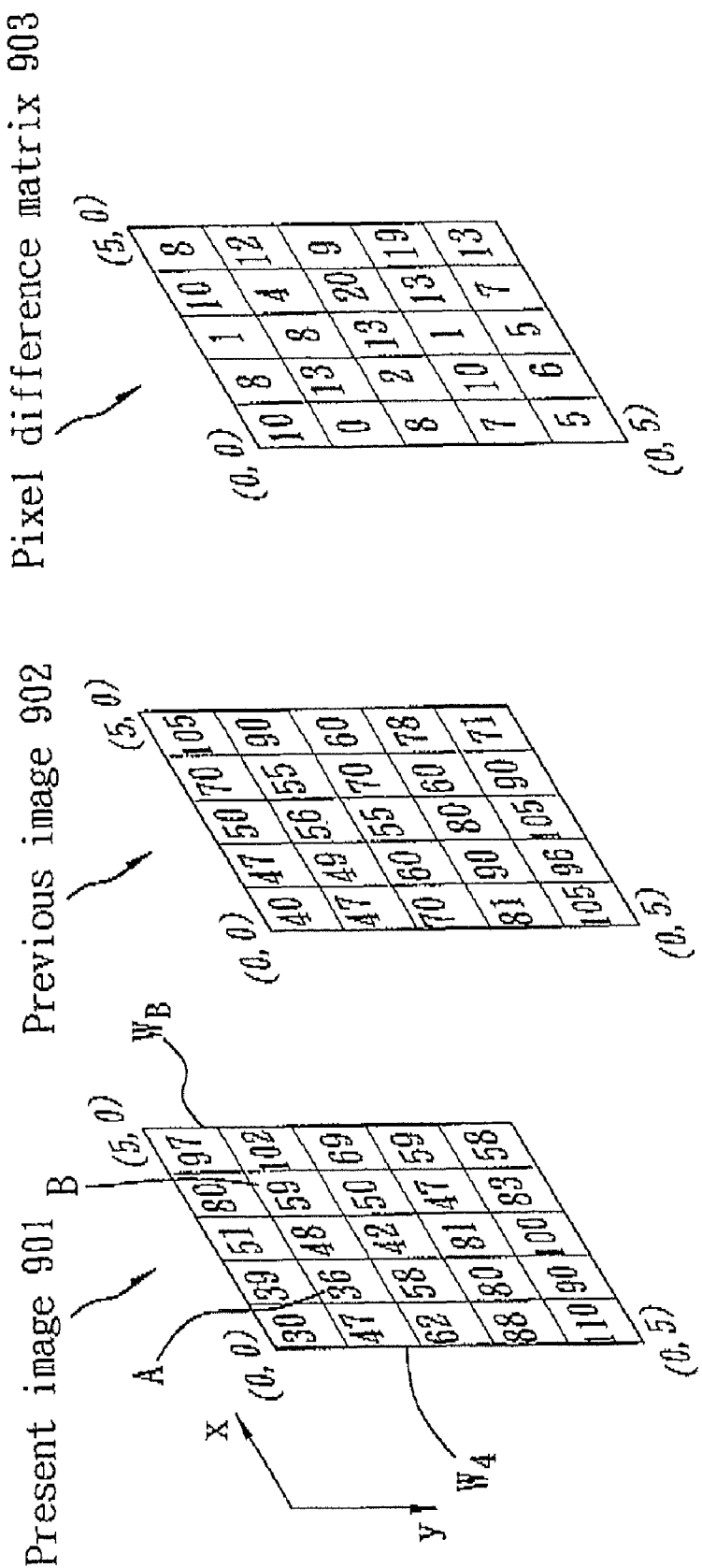
FIG. 6 is a schematic diagram for illustrating an example of pixel difference calculation.

To provide an example, with reference to FIG. 6, the pixel value at position (0,0) of the present image 901 is 30 and the pixel value at position (0,0) of the previous image 902 is 40, and therefore, the absolute value of the difference therebetween is 10. Values are obtained for other positions in the same manner, as shown by a pixel difference matrix 903.

Referring back to FIG. 5, the edge processing unit 92 includes an edge detector 921, an edge comparator 922, and a summing circuit 923.

Figure 7:
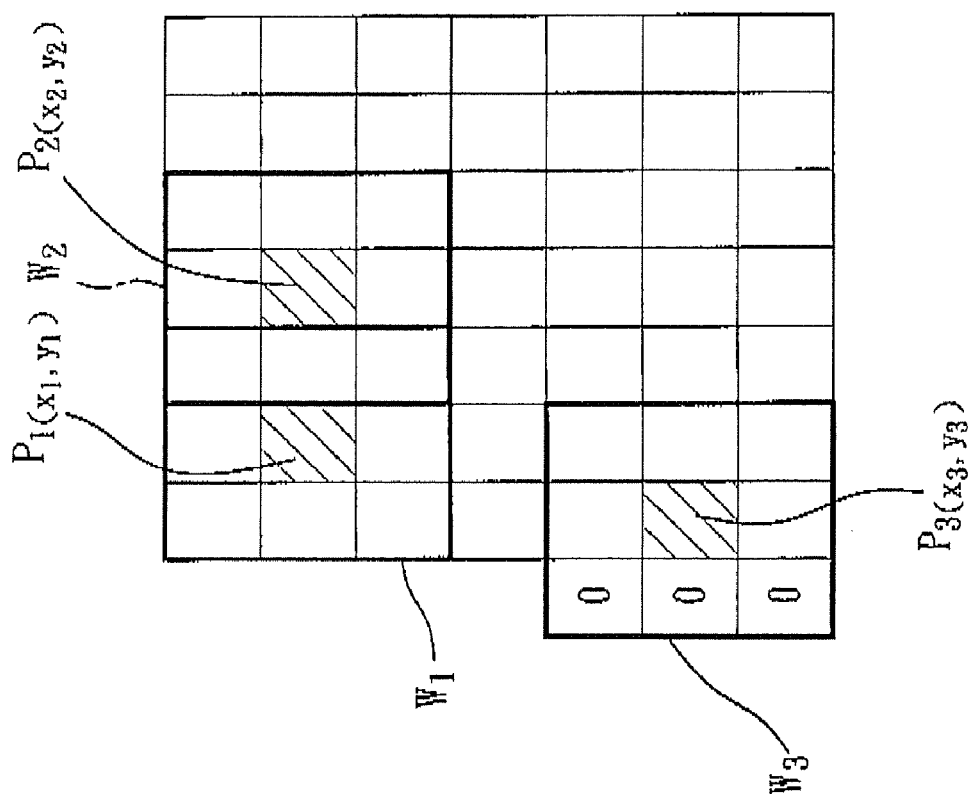
FIG. 7 is a schematic diagram for illustrating sampling windows of pixels.

The edge detector 921 establishes a sampling window centered about each pixel of the present image 901 according to a sampling window size. For example, referring to FIG. 7, assuming a sampling window size of 3×3, for pixels $P_1$ and $P_2$, the corresponding sampling windows are $W_1$ and $W_2$, respectively. For a pixel at an edge, such as $P_3$, a value of "0" for portions that lie outside the image may be used, such that a sampling window $W_3$ may still be established for pixel $P_3$. Since the previous frame has the same portion that lies outside the image, the processing result remains unaffected.

After the sampling windows are established, an edge type of each pixel in the sampling window is calculated using an edge mask. In this embodiment, a Sobel filter is used as the edge mask. The form of the edge mask is as shown below:

$$M_x = \begin{bmatrix} -1 & 0 & 1 \\ -2 & 0 & 2 \\ -1 & 0 & 1 \end{bmatrix}, M_y = \begin{bmatrix} 1 & 2 & 1 \\ 0 & 0 & 0 \\ -1 & -2 & -1 \end{bmatrix}$$

where $M_x$ is a horizontal edge mask and $M_y$ is a vertical edge mask.

Subsequently, it is assumed that the sampling window has a sampling window size of 3×3:

$$A = \begin{bmatrix} P_{x-1,y+1} & P_{x,y+1} & P_{x+1,y+1} \\ P_{x-1,y} & P_{x,y} & P_{x+1,y} \\ P_{x-1,y-1} & P_{x,y-1} & P_{x+1,y-1} \end{bmatrix}$$

where $P_{x,y}$ is the pixel value at the center point, and the remaining entries are the pixel values in the sampling window adjacent to the center point.

Next, a horizontal gradient value $G_x$ and a vertical gradient value $G_y$ are calculated as follows:

$$G_x = M_x \cdot A$$
$$= \begin{bmatrix} -1 & 0 & 1 \\ -2 & 0 & 2 \\ -1 & 0 & 1 \end{bmatrix} \cdot \begin{bmatrix} P_{x-1,y+1} & P_{x,y+1} & P_{x+1,y+1} \\ P_{x-1,y} & P_{x,y} & P_{x+1,y} \\ P_{x-1,y-1} & P_{x,y-1} & P_{x+1,y-1} \end{bmatrix}$$
$$= (-1) \cdot P_{x-1,y+1} + 0 \cdot P_{x,y+1} + 1 \cdot P_{x+1,y+1} + (-2) \cdot P_{x-1,y} +$$
$$0 \cdot P_{x,y} + 2 \cdot P_{x+1,y} + (-1) \cdot P_{x-1,y-1} + 0 \cdot P_{x,y-1} + 1 \cdot P_{x+1,y-1}$$

$$G_y = M_y \cdot A$$
$$= \begin{bmatrix} 1 & 2 & 1 \\ 0 & 0 & 0 \\ -1 & -2 & -1 \end{bmatrix} \cdot \begin{bmatrix} P_{x-1,y+1} & P_{x,y+1} & P_{x+1,y+1} \\ P_{x-1,y} & P_{x,y} & P_{x+1,y} \\ P_{x-1,y-1} & P_{x,y-1} & P_{x+1,y-1} \end{bmatrix}$$
$$= 1 \cdot P_{x-1,y+1} + 2 \cdot P_{x,y+1} + 1 \cdot P_{x+1,y+1} + 0 \cdot P_{x-1,y} +$$
$$0 \cdot P_{x,y} + 0 \cdot P_{x+1,y} + (-1) \cdot P_{x-1,y-1} + (-2) \cdot P_{x,y-1} +$$
$$(-1) \cdot P_{x+1,y-1}$$

Next, the edge type of each pixel of the sampling window is determined by the relationship of the horizontal gradient value $G_x$ and the vertical gradient value $G_y$ to a first threshold value and a second threshold value (where the first threshold value is larger than the second threshold value) as follows:

(i) When the absolute value of $G_x$ is larger than the first threshold value and the absolute value of $G_y$ is smaller than the second threshold value, it is determined that the edge type of the pixel $P_{x,y}$ at the center point of the sampling window is V-edge (Vertical Edge).

(ii) When the absolute value of $G_x$ is smaller than the second threshold value and the absolute value of $G_y$ is larger than the first threshold value, it is determined that the edge type of the pixel $P_{x,y}$ at the center point of the sampling window is H-edge (Horizontal Edge).

(iii) When both the absolute values of $G_x$ and $G_y$ are larger than the second threshold value and a product of $G_x$ and $G_y$ is positive, it is determined that the edge type of the pixel $P_{x,y}$ at the center point of the sampling window is L-edge (Left Edge).

(iv) When both the absolute values of $G_x$ and $G_y$ are larger than the second threshold value and the product of $G_x$ and $G_y$ is negative, it is determined that the edge type of the pixel $P_{x,y}$ at the center point of the sampling window is R-edge (Right Edge).

(v) When the absolute values of $G_x$ and $G_y$ do not fall under any of these categories, it is determined that the edge type of the pixel $P_{x,y}$ at the center point of the sampling window is indeterminate or M (Mess).

After the edge types of all center point pixels of the sampling window are detected, the results are stored in an edge type window having the same size as the present image 901. That is, each pixel of the present image 901 has a corresponding edge type.

For instance, referring again to FIG. 6, assuming a sampling window size of 3×3, two pixels A, B of the present image 901 are taken as center points, and the corresponding sampling windows are $W_A$, $W_B$, the horizontal gradient values $G_x$ and the vertical gradient values $G_y$ of the pixels A, B are calculated as follows:

$$G_x = M_x \cdot A = \begin{bmatrix} -1 & 0 & 1 \\ -2 & 0 & 2 \\ -1 & 0 & 1 \end{bmatrix} \cdot \begin{bmatrix} 30 & 39 & 51 \\ 47 & 36 & 48 \\ 62 & 58 & 42 \end{bmatrix} = 3$$

$$G_y = M_y \cdot A = \begin{bmatrix} 1 & 2 & 1 \\ 0 & 0 & 0 \\ -1 & -2 & -1 \end{bmatrix} \cdot \begin{bmatrix} 30 & 39 & 51 \\ 47 & 36 & 48 \\ 62 & 58 & 42 \end{bmatrix} = -61$$

$$G_x = M_x \cdot B = \begin{bmatrix} -1 & 0 & 1 \\ -2 & 0 & 2 \\ -1 & 0 & 1 \end{bmatrix} \cdot \begin{bmatrix} 51 & 80 & 97 \\ 48 & 59 & 102 \\ 42 & 50 & 69 \end{bmatrix} = 181$$

$$G_y = M_y \cdot B = \begin{bmatrix} 1 & 2 & 1 \\ 0 & 0 & 0 \\ -1 & -2 & -1 \end{bmatrix} \cdot \begin{bmatrix} 51 & 80 & 97 \\ 48 & 59 & 102 \\ 42 & 50 & 69 \end{bmatrix} = 97$$

If it assumed that the first threshold value is 150 and the second threshold value is 50, then the edge types of the pixels A, B can be determined using the technique to determine edge type as outlined above, the result of which is as follows:

Edge type of A=M
Edge type of B=L

Figure 8:
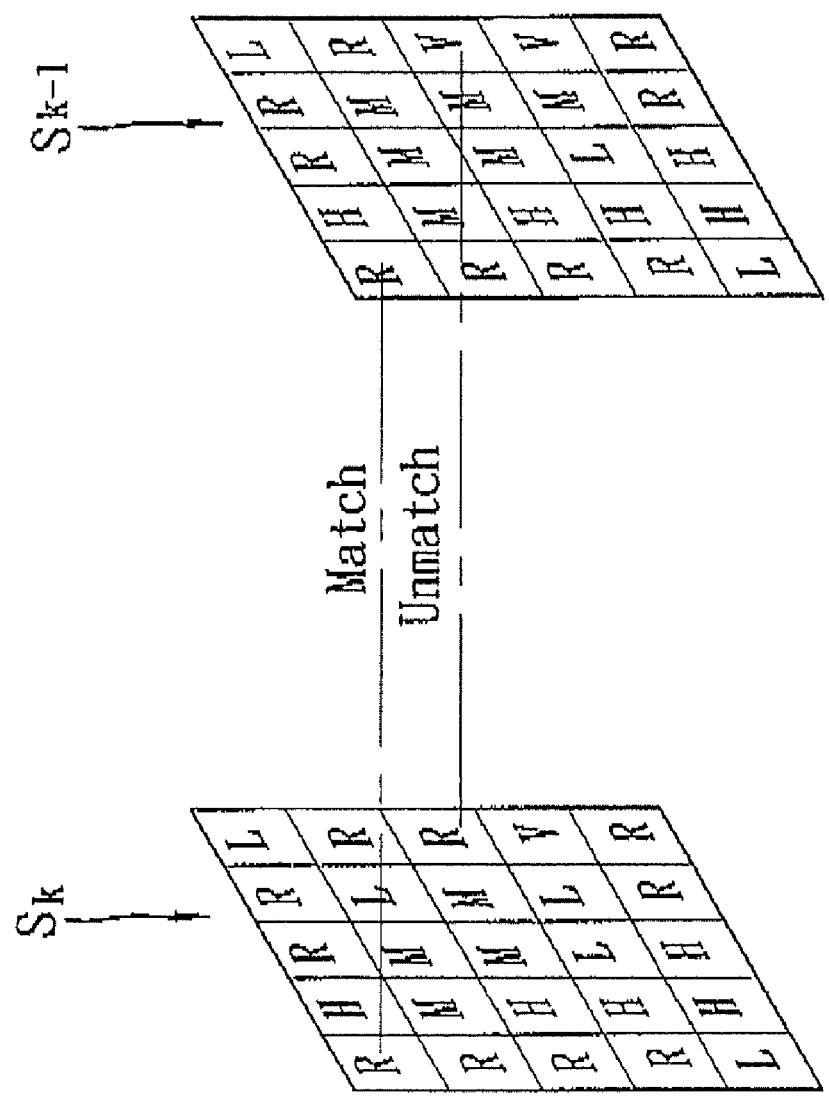
FIG. 8 is a schematic diagram for illustrating a comparison between edge type windows of a present image and a previous image.

After receiving the edge type window of the present image 901, the edge comparator 922 compares the same with the edge type window of the previous image 902. Referring to FIG. 8, when the edge types of the pixels at the same position of the two edge type windows are the same, this is deemed an edge match. When the edge types of the pixels at the same position of the two edge type windows are not the same, this is deemed an edge unmatch. The edge comparator 922 outputs the comparison results to a result window for subsequent transmission to the summing circuit 923. Next, the summing circuit 923 sums the number of the edge matches in the result window, hereinafter referred to as a sum value (S_SUM), and sends the sum value (S_SUM) together with the result window to the noise level processing unit 93. For the example shown in FIG. 8, the sum value (S_SUM) is 18 (the pixels that have edge types (M) are not counted).

The noise level processing unit 93 compares the sum value (S_SUM) with a predetermined threshold value. If the sum value (S_SUM) is larger than the threshold value, the absolute values of the pixel differences corresponding to all the edge match pixels in the result window are added so as to generate a sum of absolute difference (SAD). The absolute values of the pixel differences are received from the pixel difference calculator 91. When the sum value (S_SUM) is larger than the threshold value, this indicates that the edge types of most pixels in the present image 901 are not changed, i.e., that most pixels in the present image 901 are unmoved, static pixels, or that the present image 901 may be deemed a static image. Hence, it may be concluded that the pixel differences are caused by noise. On the other hand, when the sum value (S_SUM) is smaller than the threshold value, this indicates that the edge types of most pixels in the present image 901 are changed, i.e., that most pixels in the present image 901 are moved, dynamic pixels, or that the present image 901 may be deemed a dynamic image. Hence, it may be concluded that the pixel differences are caused by motion of an object. Moreover, a noise level (NL) can be calculated by the noise level processing unit 93 according to the following equation:

Noise Level (NL)=(SAD)/(sum of pixel difference values corresponding to edge match pixels)

The purpose of the above technique is as follows: upon determining that the present image 901 is the sum of absolute difference of a static image, that is, the sum of noise, normalization is conducted, such that a determination of the dynamic adjustment of the signal strength is made according to image type, and, in turn, noise is more accurately determined.

From the foregoing example, if it is assumed that the threshold value is 13, the sum value (S_SUM) of 18 in FIG. 8 exceeds than the threshold value. Therefore, according to FIG. 6, the sum of absolute difference is calculated as follows:

SAD=10+8+1+10+8+0+12+8+7+10+1+19+5+6+5+7+ 13=130

Hence, the noise level (NL) is:

$$NL = \frac{130}{17} = 7.64$$

After receiving the noise level (NL), the blending value determining unit 94 determines a blending value (K) by referencing a lookup table on the basis of the magnitude of the noise level (NL). The blending value (K) is positively correlated to the noise level (NL). In other words, when the noise level (NL) becomes large, this indicates an increase in the static component. Therefore, it is necessary to increase the ratio of the previous image 902, such that the blending value (K) is increased accordingly. In practice, the relation between the blending value (K) and the noise level (NL) is not necessarily obtained using a lookup table, and alternatively, and a continuous function or a discrete function may be used to form a relation between the blending value (K) and the noise level (NL).

Referring back to FIG. 5, the output unit 95 obtains an output image 951 by adding weights of the present image 901 and the previous image 902 based on the blending value (K). The output image 951 is fed back to the pixel difference calculator 91 for use as a previous image 902 in a subsequent calculation. The equation for calculating the output image 951 is as follows:

output image 951=pixel value of present image 901× (1−K)+pixel value of previous image 902×K.

It is to be noted that, in one embodiment, the edge detector 921 first processes all pixels before transmission of the processing result to the edge comparator 922 for further processing thereby, and the edge comparator 922 first processes all the pixels before transmission of this processing result to the noise level processing unit 93 for processing thereby. In another embodiment, a first pixel is processed sequentially by the edge detector 921, the edge comparator 922, and the noise level processing unit 93, after which a second pixel is identically processed sequentially, and soon.

Second Preferred Embodiment

The second preferred embodiment according to this invention differs from the first preferred embodiment in that the second preferred embodiment performs processing with respect to fields.

Figure 9:
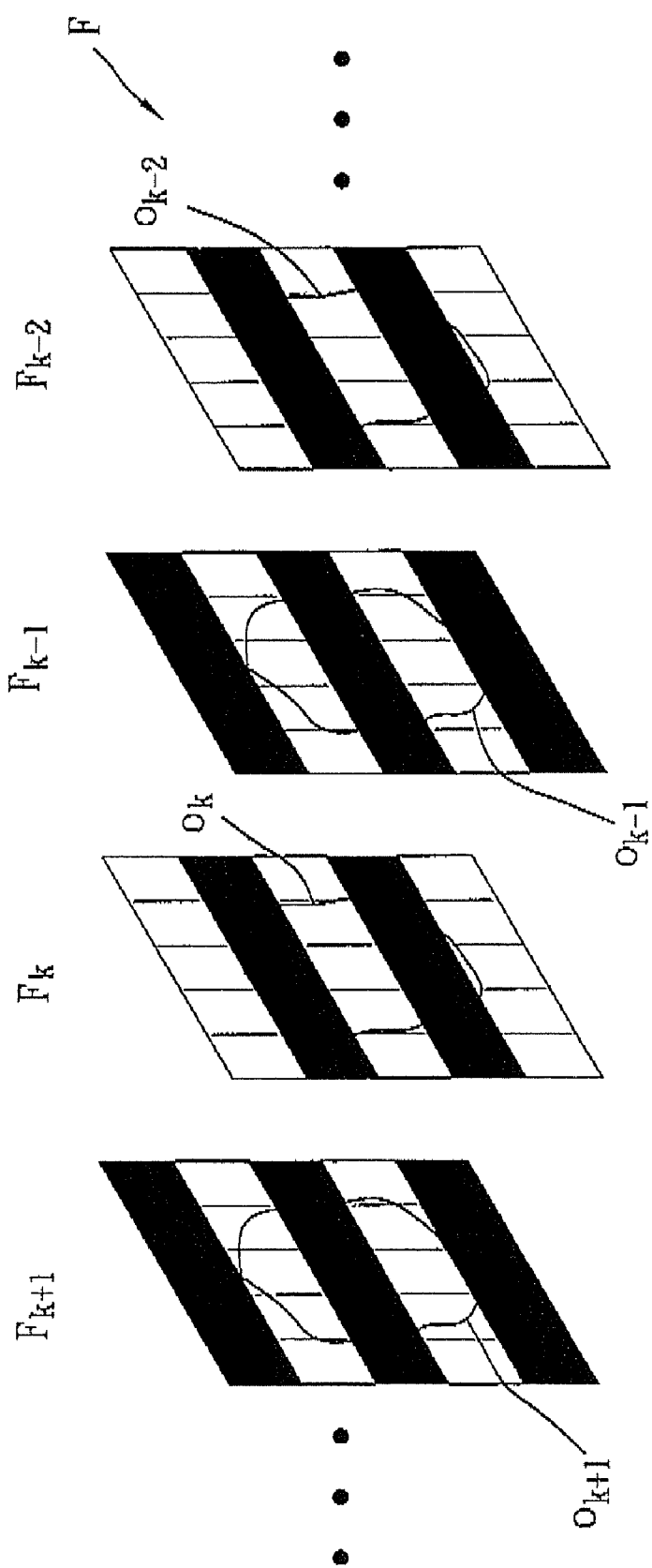
FIG. 9 is a schematic diagram of a field sequence.

Referring to FIG. 9, a consecutive field sequence (F) is formed by interposing a top field, such as field ($F_{k-2}$) or field ($F_k$), between a pair of bottom fields, such as fields ($F_{k-1}$) and ($F_{k+1}$).

Figure 10:
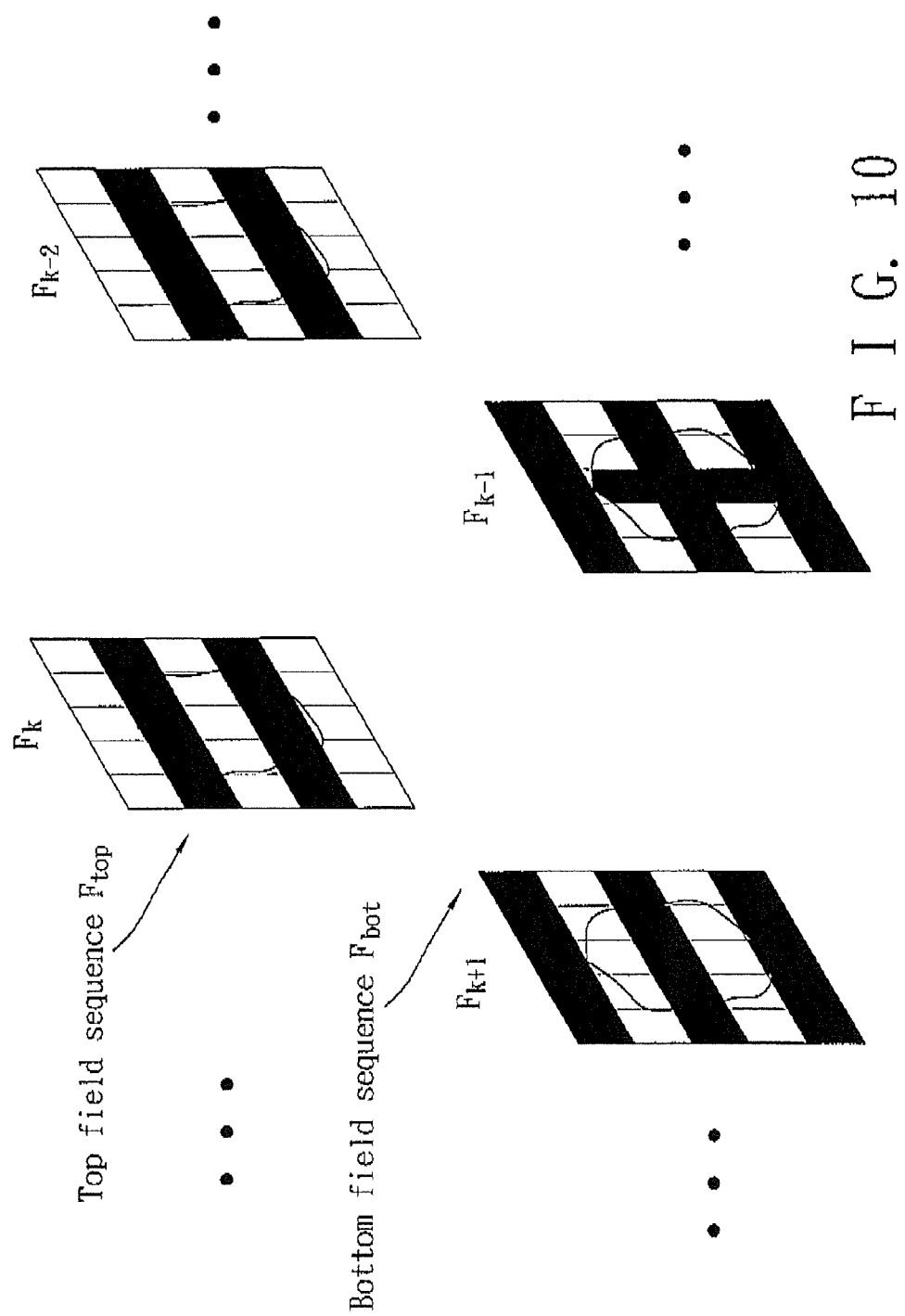
FIG. 10 is a schematic diagram of an upper field sequence and a lower field sequence.

Similar to the first preferred embodiment, the present image is a kth field (or a (k+1)th field), and the previous image is a (k−2)th field (or a (k−1)th field). Therefore, referring to FIG. 10, after the top field sequence ($F_{top}$) and the bottom field sequence ($F_{bot}$) are split into two independent field sequences, the image processing apparatus 9 of this invention can be used to perform noise level determination. For example, the field ($F_k$) of the top field sequence ($F_{top}$) is the present image and the field ($F_{k-2}$) thereof is the previous image. Similarly, the field ($F_{k+1}$) of the bottom field sequence ($F_{bot}$) is the present image and the field ($F_{k-1}$) thereof is the previous image. Subsequently, the top field sequence ($F_{top}$) and the bottom field sequence ($F_{bot}$) can be processed separately by two image processing apparatuses 9 in a parallel manner, or a single image processing apparatus 9 may be used to perform processing consecutively of the top field sequence ($F_{top}$) and the bottom field sequence ($F_{bot}$) under a time-sharing scheme.

Preferred Embodiment of Image Processing Method

Figure 11:
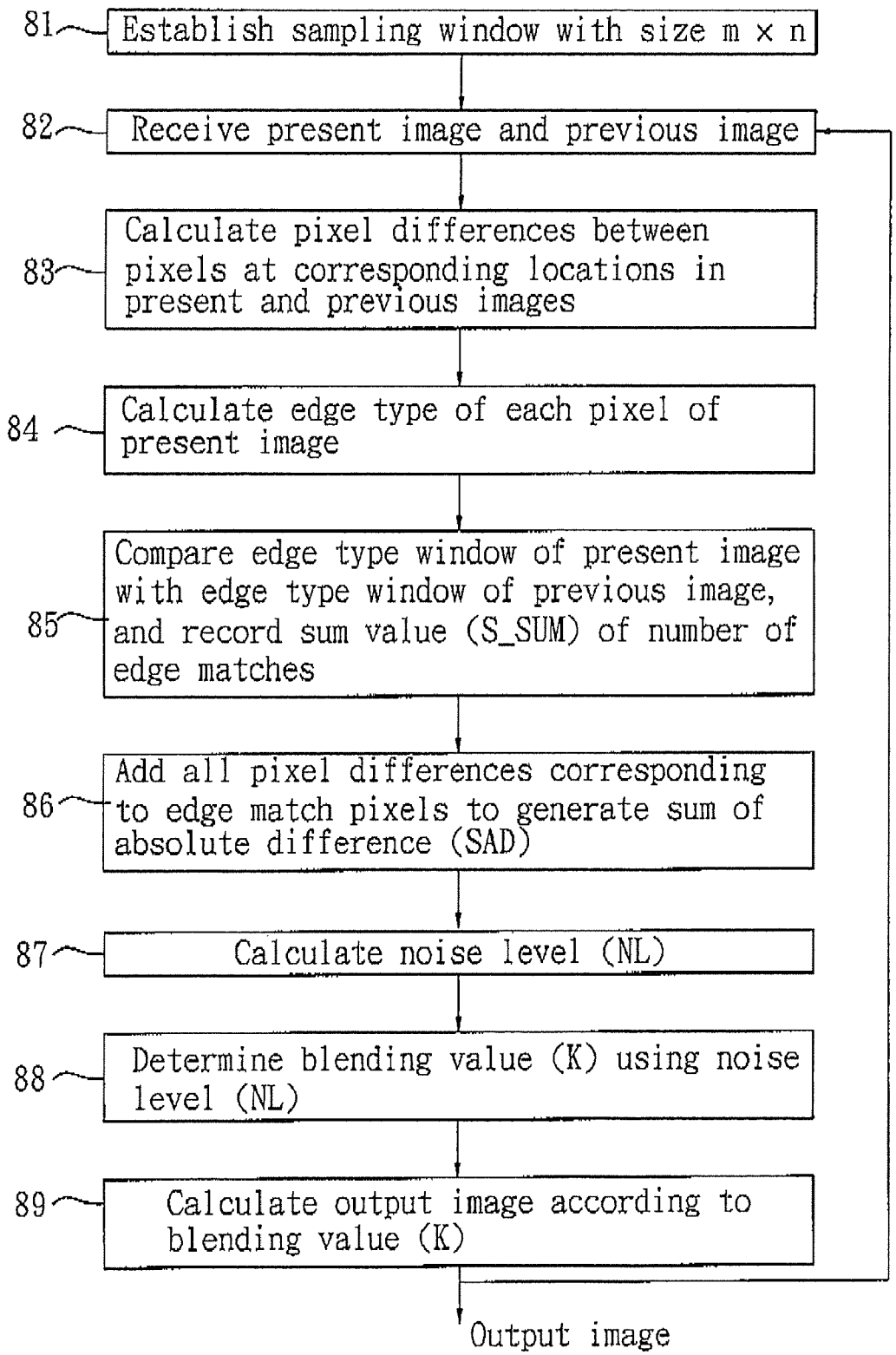
FIG. 11 is a flowchart of the preferred embodiment of an image processing method according to the present invention.

Referring to FIG. 11, the preferred embodiment of an image processing method according to this invention for determining a noise level in an image comprises the steps as outlined below.

In step 81, a sampling window with a size m×n is established.

In step 82, a present image and a previous image are received, in which the present image is a kth frame (or a kth field) and the previous image is a (k−1)th frame (or a (k−1)th field).

In step 83, pixel differences are calculated between pixels at corresponding locations in the present image and the previous image.

In step 84, the edge type of each pixel of the present image is calculated, and the result (of edge types) is stored in an edge type window. The calculation of edge types is carried out as described above.

In step 85, the edge type window of the present image is compared with the edge type window of the previous image, and the sum value (S_SUM) of the number of edge matches is recorded.

In step 86, when the sum value (S_SUM) is larger than a threshold value, all pixel differences corresponding to edge match pixels are added so as to generate a sum of absolute difference (SAD).

In step 87, a noise level (NL) is calculated as described above.

In step 88, a blending value (K) is determined using the magnitude of the noise level (NL) to reference a lookup table. Of course, the relation between the blending value (K) and the noise level (NL) need not necessarily be obtained from a lookup table, and a continuous function or a discrete function may be used to form a relation between the blending value (K) and the noise level (NL).

In step 89, an output image is calculated according to the blending value (K), and the output image is fed back to the pixel difference calculator 91 for use as a previous image in a subsequent calculation. The output image is calculated as described above.

In sum, the image processing apparatus and method of this invention first determine whether there is a moving object by a process involving edge determination, and excludes the pixel differences caused by the presence of such a moving object during calculation of SAD. As a result, a more meaningful SAD may be derived to thereby allow for acquisition of more accurate noise information. Hence, images corrected while considering such factors is such that the problems associated with the prior art may be avoided.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An image processing apparatus for processing a previous image and a present image to output an output image, the previous image having a plurality of first pixels and the present image having a plurality of second pixels, said image processing apparatus comprising:
 a pixel difference calculating unit for calculating pixel differences between pairs of the first and second pixels at corresponding positions, and outputting a plurality of pixel difference values;
 an edge processing unit for detecting and comparing edge types of the first pixels and edge types of the second pixels, summing a number of the edge types that are the same, and outputting a sum value;
 a noise level processing unit coupled to said edge processing unit and said pixel difference calculator, and which calculates a noise level of the present image according to the sum value and the pixel differences;
 a blending value determining unit coupled to said noise level processing unit, and which determines a blending value according to the noise level; and
 an output unit coupled to said blending value determining unit, and which adds weights of the present image and the previous image according to the blending value to generate and output the output image.

2. The image processing apparatus of claim 1, wherein said edge processing unit includes:
 an edge detector for detecting the edge types of the first pixels and the edge types of the second pixels, and outputting a plurality of edge detection results;
 an edge comparator coupled to said edge detector, and which compares the edge detection results and outputting a comparison result; and
 a summing circuit coupled to said edge comparator, and which sums the number of the edge types of the first pixels that are the same with the edge types of the second pixels according to the comparison result, and outputs the sum value.

3. The image processing apparatus of claim 2, wherein said edge detector establishes a sampling window centered about each first pixel and each second pixel, so as to calculate the edge type of each first pixel and each second pixel, and outputs said plurality of edge detection results.

4. The image processing apparatus of claim 3, wherein the sum value is obtained by summing the number of the edge types of the first pixels and the second pixels that are the same in the sampling windows.

5. The image processing apparatus of claim 2, wherein said edge comparator is a Sobel filer.

6. The image processing apparatus of claim 1, wherein, when the sum value is larger than a threshold value, said noise level processing unit determines the present image to be a static image.

7. An image processing method for processing a previous image and a present image to output an output image, the previous image having a plurality of first pixels and the present image having a plurality of second pixels, said image processing method comprising:
 calculating pixel differences between pairs of the first and second pixels and the second pixels at corresponding positions, and outputting a plurality of pixel difference values;
 detecting and comparing edge types of the first pixels and edge types of the second pixels, summing a number of the edge types that are the same, and outputting a sum value;
 calculating a noise level of the present image according to the sum value and the pixel differences;
 determining a blending value according to the noise level; and
 adding weights of the present image and the previous image according to the blending value to generate and output the output image.

8. The image processing method of claim 7, wherein detecting and comparing edge types of the first pixels and edge types of the second pixels, summing a number of the edge types that are the same, and outputting a sum value includes:
 detecting the edge types of the first pixels and the edge types of the second pixels, and outputting a plurality of edge detection results;
 comparing the edge detection results and outputting a comparison result; and
 summing the number of the edge types of the first pixels that are the same with the edge types of the second pixels according to the comparison result, and outputting the sum value.

9. The image processing method of claim 8, wherein detecting the edge types includes:
 establishing a sampling window centered about each first pixel and each second pixel, so as to calculate the edge type of each first pixel and each second pixel, and outputting said plurality of edge detection results.

10. The image processing method of claim 9, wherein the sum value is obtained by summing the number of the edge types of the first pixels and the second pixels that are the same in the sampling windows.

11. The image processing method of claim 8, wherein detecting the edge types of the first pixels and the edge types of the second pixels is realized using a Sobel filer.

12. The image processing method of claim 7, wherein, when the sum value is larger than a threshold value, the present image is determined to be a static image.

* * * * *